(12) United States Patent
Fujita et al.

(10) Patent No.: US 8,841,036 B2
(45) Date of Patent: Sep. 23, 2014

(54) FLEXIBLE FUEL CELL

(75) Inventors: Shuji Fujita, Tokyo (JP); Takaaki Nakagawa, Kanagawa (JP); Ryuhei Matsumoto, Kanagawa (JP); Hideyuki Kumita, Kanagawa (JP); Daisuke Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 754 days.

(21) Appl. No.: 13/087,470

(22) Filed: Apr. 15, 2011

(65) Prior Publication Data

US 2011/0287328 A1    Nov. 24, 2011

(30) Foreign Application Priority Data

May 18, 2010    (JP) .................. 2010-114139

(51) Int. Cl.
*H01M 8/04* (2006.01)
*H01M 8/24* (2006.01)
*H01M 2/38* (2006.01)
*H01M 2/40* (2006.01)
*H01M 8/16* (2006.01)

(52) U.S. Cl.
CPC ............. *H01M 8/16* (2013.01); *Y02E 60/527* (2013.01)
USPC ............ 429/401; 429/452; 429/462

(58) Field of Classification Search
USPC .............................. 429/401, 452, 462
See application file for complete search history.

(56) References Cited

U.S. PATENT DOCUMENTS

| 5,047,133 A * | 9/1991 | Allen ........................ 204/258 |
| 7,238,440 B2 * | 7/2007 | Damore et al. ............ 429/401 |
| 7,384,701 B2 * | 6/2008 | Halme et al. ................ 429/2 |

FOREIGN PATENT DOCUMENTS

| JP | 2008-282586 | 11/2008 |
| JP | 2009-048848 | 3/2009 |

* cited by examiner

*Primary Examiner* — Patrick Ryan
*Assistant Examiner* — Julian Anthony
(74) *Attorney, Agent, or Firm* — Sony Corporation (57) ABSTRACT

Disclosed herein is a flexible fuel cell including, one or a plurality of cell sections, and a sealing sheet covering the cell section or sections, wherein the cell section has, at least, a pair of electrode sheets which form an anode and a cathode and at least one of which is accompanied by an oxidoreductase present at a surface thereof, a separator which is disposed between the electrode sheets and which has a proton-permeable membrane, a pair of current collectors which are electrically conductively connected respectively to the electrode sheets with a conductive adhesive, and a fuel reservoir section which is provided at such a position as to make contact with the anode at least and in which a fuel solution containing a fuel component is reserved.

6 Claims, 5 Drawing Sheets

FLEXIBLE FUEL CELL

BACKGROUND

The present technology relates to a flexible fuel cell, that is, a fuel cell which is flexible. More particularly, the present technology relates to a biofuel cell in which an enzyme is used as a reaction catalyst.

Figure 7:
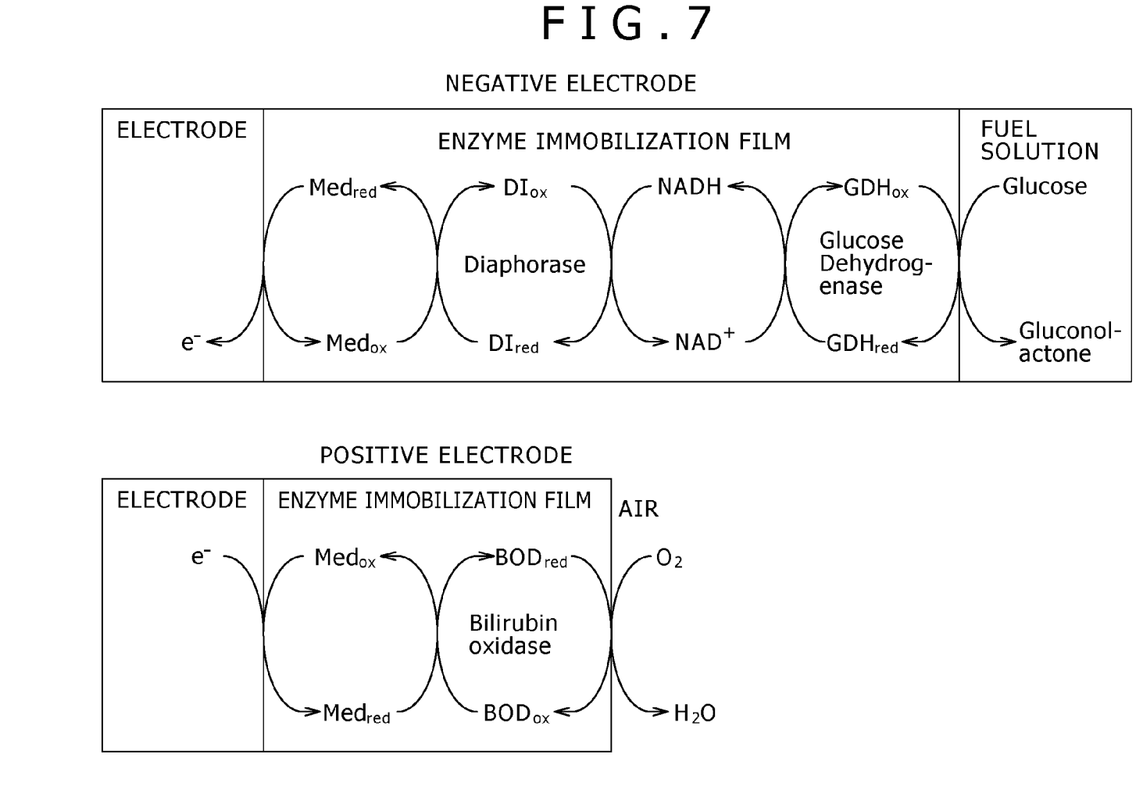
FIG. 7 shows a reaction scheme of a biofuel cell in which an enzyme is used.

Biofuel cells in which an oxidoreductase is used as a reaction catalyst are advantageous in that electrons can be efficiently taken out from a fuel which cannot be utilized with ordinary industrial catalysts, such as glucose and ethanol. In view of this, the biofuel cells are expected as next-generation fuel cells high in capacity and safety. FIG. 7 shows a reaction scheme of a biofuel cell in which an enzyme is used. For example, in the case of a biofuel cell using glucose as a fuel, as shown in FIG. 7, an oxidation reaction of glucose proceeds and electrons are taken out at a negative electrode (anode), whereas a reduction reaction of oxygen ($O_2$) in the atmospheric air proceeds at a positive electrode (cathode).

On the other hand, casings of ordinary cells are formed from a material poor in flexibility, such as metal. This is for preventing fuel crossover which might arise from damage to an electrolyte membrane or structural strain under an external stress, or for preventing flow-out of, for example, a solution from inside the cell due to breakage of the cell. Further, in the cells according to related art, an electrolyte or a catalyst layer inside the cell may also be formed by use of a hard material which lacks flexibility.

Similarly, in biofuel cells, casings made of a plastic or metal have been used. For instance, Japanese Patent Laid-open No. 2008-282586 proposes a button cell or tubular cell in which a metallic casing is used. Besides, Japanese Patent Laid-open No. 2009-048848 proposes a cubic cell in which a plastic-made casing is used.

SUMMARY

However, in the cases of fuel cells or the like where supply of fuel is needed and where a gradient of a dissolved substance or pH of a solution is generated at the fuel electrode (anode) and the air electrode (cathode), there is a problem that the cell performance is rapidly lowered with the lapse of time. In view of this problem, the fuel cells (of active type) in the related art may be additionally provided with a function to stir the fuel solution by use of electric power, so as to effect mixing of the fuel solution. In this case, however, the use of electric power for stirring leads to a lowering in power generation efficiency, and, further, the structure of the cell is complicated.

Besides, in biofuel cells, it is important to simplify the structure and to enhance the generation efficiency. Particularly, in passive-type biofuel cells, there is a request for a method of stirring the solution in the cell section(s) without use of electric power.

Thus, there is a major need for a flexible fuel cell in which a solution contained in the cell can be easily stirred and cell performance can thereby be restored.

According to an embodiment of the present technology, there is provided a flexible fuel cell including: one or a plurality of cell sections; and a sealing sheet covering the cell section or sections, wherein the cell section has, at least: a pair of electrode sheets which form an anode and a cathode and at least one of which is accompanied by an oxidoreductase present at a surface thereof; a separator which is disposed between the electrode sheets and which has a proton-permeable membrane; a pair of current collectors which are electrically conductively connected respectively to the electrode sheets with a conductive adhesive; and a fuel reservoir section which is provided at such a position as to make contact with the anode at least and in which a fuel solution containing a fuel component is reserved.

Here, the surface of the electrode sheet includes the outer surfaces of the electrode and the inner surfaces of voids in the inside of the electrode. The same applies hereinafter.

In the embodiment of the present technology as above, the cell section(s) and a casing (sealing sheet) have flexible materials, so that the cell is, as a whole or partly, easily deformed under an external pressure. Therefore, by a simple method such as bending of the cell, it is possible to easily stir a solution (a fuel solution, an electrolyte solution or the like) with which the cell is filled.

In the fuel cell as above, the electrode sheet may be formed from carbon fibers.

In addition, the flexible fuel cell may have a configuration in which the sealing sheet on the cathode side is provided with a plurality of holes, and a gas-permeable membrane which is impermeable to liquid and is permeable only to gas is disposed between the sealing sheet and the electrode sheet constituting the cathode.

Besides, the cell section may be provided with a reference electrode for checking of cell performance.

Further, the flexible fuel cell may have a bellows structure in which a mountain fold and a valley fold are formed repeatedly. In this case, a configuration may be adopted in which the sealing sheet is provided with terminals, and the cells are connected in series or in parallel with each other through stacking.

According to the embodiment of the present technology as above, the solution with which the cell is filled can be easily stirred. Therefore, a gradient of concentration and a gradient of pH can be dispelled, thereby restoring the cell performance.

DETAILED DESCRIPTION OF THE PREFERRED EMBODIMENTS

Now, some embodiments of the present technology will be described in detail below, referring to the accompanying drawings. Incidentally, the present technology is not to be limited to the following embodiments. The description will be made in the following order.

1. First Embodiment
   (an example of sheet-shaped flexible biofuel cell)
2. Second Embodiment
   (an example of flexible biofuel cell with holes formed in sealing sheet on air electrode side)
3. Third Embodiment
   (an example of flexible biofuel cell having a bellows structure)

<1. First Embodiment>
[General Configuration]

Figure 1:
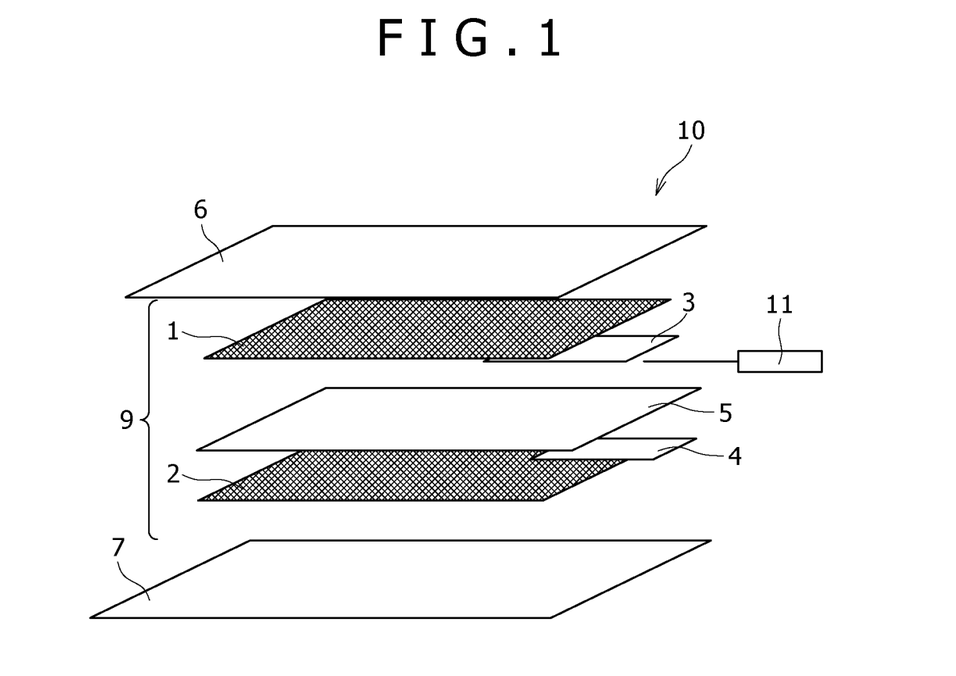
FIG. 1 is an exploded perspective view showing the configuration of a biofuel cell according to a first embodiment of the present technology.

First, a flexible biofuel cell according to a first embodiment of the present technology (hereinafter referred to simply as biofuel cell) will be described. FIG. 1 is an exploded perspective view showing the configuration of the biofuel cell according to this embodiment. As shown in FIG. 1, in the biofuel cell 10 in this embodiment, a configuration is adopted in which a cell section 9 as a whole is covered by two sealing sheets 6 and 7, and is thereby sealed.

[In Regard of Cell Section 9]

In the cell section 9 of the biofuel cell 10, an anode electrode sheet 1 and a cathode electrode sheet 2 are disposed opposite to each other, with a predetermined spacing therebetween. Of these electrode sheets 1 and 2, at least the anode electrode sheet 1 is accompanied by an oxidoreductase present at a surface thereof, the oxidoreductase functioning as a reaction catalyst. In addition, an anode current collector 3 and a cathode current collector 4 are electrically conductively connected respectively to the anode electrode sheet 1 and the cathode electrode sheet 2, with a conductive adhesive (not shown).

Further, a separator 5 is disposed between the pair of electrode sheets 1 and 2. In addition, a fuel reservoir section in which a fuel solution containing a fuel component is reserved is provided at such a position as to make contact with the anode electrode sheet 1, at least. Specifically, for example in the case where the separator 5 is formed from a liquid-impermeable material, the space between the sealing sheet 6 and the separator 5 serves as the fuel reservoir section. In the case where the separator 5 is formed from a liquid-permeable material, the space between the sealing sheet 6 and the sealing sheet 7 serves as the fuel reservoir section.

[Electrode Sheets 1 and 2]

As the electrode sheets 1 and 2, there can be used, for example, flexible carbon materials such as carbon felt, carbon paper, carbon fibers or carbon particulates in laminate form. Incidentally, the thickness of each of these electrode sheets 1 and 2 is not particularly limited, and may be appropriately selected according to the strength and/or properties (e.g., resistance) of the material used for the electrode sheets 1, 2.

Besides, as an enzyme immobilized on the surface of the anode electrode sheet 1, for example in the case where the fuel component is glucose, there can be used glucose dehydrogenase (GDH) by which glucose is decomposed. Further, in the case where a monosaccharide such as glucose is used as the fuel component, a coenzyme oxidase and/or an electron mediator is desirably immobilized on the anode surface, in addition to the oxidase which accelerates oxidation of the monosaccharide such as GDH to thereby decompose the monosaccharide.

The coenzyme oxidase is for oxidizing a coenzyme which is reduced by an oxidase (for example, $NAD^+$, $NADP^+$, etc.) and a reduced coenzyme (for example, NADH, NADPH, etc.). Examples of the coenzyme oxidase include diaphorase. When the coenzyme is returned to the oxidized form under the action of the coenzyme oxidase, electrons are produced.

The electrons thus produced are transferred from the coenzyme oxidase to the electrode through the electron mediator.

As the electron mediator, there is preferably used a compound having a quinone skeleton, particularly, a compound having a naphthoquinone skeleton. Specific examples of such a compound which can be used here include 2-amino-1,4-naphthoquinone (ANQ), 2-amino-3-methyl-1,4-naphthoquinone (AMNQ), 2-methyl-1,4-naphthoquinone (VK3), and 2-amino-3-carboxy-1,4-naphthoquinone (ACNQ). Besides, as the compound having the quinone skeleton, not only the compounds having the naphthoquinone skeleton but also anthraquinone and its derivatives can be used, for example. Further, if necessary, together with the compound having the quinone skeleton, one or more other compounds which act as electron mediator may be immobilized on the anode surface.

On the other hand, in the case where a polysaccharide is used as the fuel component, a breakdown enzyme capable of accelerating decomposition (e.g., hydrolysis) of the polysaccharide to produce a monosaccharide such as glucose is desirably immobilized on the anode surface, in addition to the above-mentioned oxidase, coenzyme oxidase, coenzyme and electron mediator. Incidentally, the term "polysaccharides" here is used in a wide meaning, namely, is used to mean all the carbohydrates capable of producing two or more monosaccharide molecules through hydrolysis, and it includes oligosaccharides such as disaccharides, trisaccharides, tetrasaccharides, etc. Specific examples of the polysaccharide include starch, amylose, amylopectin, glycogen, cellulose, maltose, sucrose, and lactose. These have two or more monosaccharides bonded to each other. Every one of the polysaccharides contains glucose as the monosaccharide serving as bonding units.

Besides, amylose and amylopectin are components contained in starch; in other words, starch is a mixture of amylose and amylopectin. For example in the case where glycoamylase is used as a breakdown enzyme for polysaccharides and where glucose dehydrogenase is used as an oxidase for monosaccharides, polysaccharides capable of being decomposed to glucose by glucoamylase can be used as fuel component. Examples of such polysaccharides include starch, amylose, amylopectin, glycogen, and maltose. Here, glucoamylase is a breakdown enzyme for hydrolyzing α-glucan such as starch to produce glucose, and glucose dehydrogenase is an oxidase for oxidizing β-D-glucose to D-glucono-δ-lactone.

On the other hand, in the case where an oxidoreductase is immobilized also on the cathode electrode sheet 2, there can be used, for example, bilirubin oxidase, laccase, and ascorbate oxidase. Besides, examples of the electron mediator to be immobilized together with the enzyme include potassium hexacyanoferrate, potassium ferrocyanide, and potassium octacyanotungstate.

Incidentally, the electrode sheets 1 and 2 are not limited to those accompanied by the oxidoreductase immobilized on the surface thereof, insofar as the oxidoreductase is present at the electrode surface. For example, electrodes such that microorganism having an oxidoreductase and capable of acting as a reaction catalyst is deposited thereon can also be used.

[Current Collectors 3 and 4]

The material for each of the current collectors 3 and 4 is not particularly restricted, and may be any material that can be electrically connected to an external member and that does not cause an electrochemical reaction inside the biofuel cell. Examples of the material which can be used here include metallic materials such as Pt, Ag, Au, Ru, Rh, Os, Nb, Mo, In, Ir, Zn, Mn, Fe, Co, Ti, V, Cr, Pd, Re, Ta, W, Zr, Ge, Hf, etc., alloys such as alumel, brass, duralumin, bronze, Nickelin, platinum-rhodium alloy, permalloy, Permendur, German silver, phosphor bronze, etc., conductive polymers such as polyacetylene, etc., carbon materials such as carbon felt, carbon paper, carbon fibers or carbon particulates in laminate form, etc., borides such as $HfB_2$, NbB, $CrB_2$, $B_4C$, etc., nitrides such as TiN, ZrN, etc., silicides such as $VSi_2$, $NbSi_2$, $MoSi_2$, $TaSi_2$, etc., and composite materials of them.

In addition, the thicknesses and physical properties of the current collectors 3 and 4 are also not specifically restricted, insofar as the current collectors 3 and 4 are each formed from a material which has such flexibility and bendability as not to lower the flexibility of the cell as a whole and which is not greatly changed in electrical properties when bent.

[Conductive Adhesive]

The conductive adhesive is for electrically conductively fixing the current collectors 3 and 4 to the electrode sheets 1 and 2, respectively. The conductive adhesive is not particularly restricted as to its material or the like, insofar as it has no influence on the properties of the electrode sheets 1, 2 and the current collectors 3, 4. Specific examples of the conductive adhesive which can be used here include those which are prepared by dispersing natural graphite and a binder (e.g., polyvinyl butyral) in an organic solvent. Besides, the conductive adhesive to be used in the biofuel cell in this embodiment is desirably insoluble in water.

[Separator 5]

The separator 5 is for preventing shortcircuiting from occurring between the electrodes (electrode sheets 1 and 2), and is formed from a material which is flexible and is permeable to protons. Specific examples of the material which can be used here include non-woven fabric, cellophane, and PTFE (PolyTetraFluoroEthylene). Besides, the thickness and physical properties of the separator 5 are not specifically restricted, insofar as the separator 5 is formed from a material which has such flexibility and bendability as not to lower the flexibility of the cell as a whole and which is not greatly changed in properties when bent.

[Sealing Sheets 6 and 7]

For the anode-side sealing sheet 6 and the cathode-side sealing sheet 7, there can be used, for example, flexible plastic materials such as polyethylene, polypropylene, PTFE, etc., expandable-and-contractible rubbers, and so on. Particularly preferred are plastic materials, since they can be easily processed into film. In addition, where a gas-permeable membrane (e.g., PTFE film) impermeable to liquid and permeable only to gas is used as the cathode-side sealing sheet 7, air (oxygen) can be smoothly supplied to the air electrode (anode electrode sheet 2).

Furthermore, the materials and physical properties of the sealing sheets 6 and 7 are not specifically restricted, insofar as the sealing sheets 6 and 7 are each formed from a material which has such flexibility and bendability as not to lower the flexibility of the cell as a whole and which is not greatly changed in properties when bent.

[Fuel Solution]

The fuel solution is a fuel component such as saccharide (sugar), alcohol, aldehyde, lipid, protein, etc. or a solution containing at least one such fuel component. Examples of the fuel component to be used in the biofuel cell in this embodiment include saccharides such as glucose, fructose, sorbose, etc., alcohols such as methanol, ethanol, propanol, glycerin, polyvinyl alcohol, etc., aldehydes such as formaldehyde, acetaldehyde, etc., and organic acids such as acetic acid, formic acid, pyruvic acid, etc. Other examples than the just-mentioned include oils and fats, proteins, and organic acids as intermediate products of saccharometabolism of these substances.

[Operation]

Now, operation of the biofuel cell 10 according to the present embodiment will be described below. In the biofuel cell in this embodiment, the fuel solution is injected into such a position as to make contact with the anode electrode sheet 1, for example, a position between the anode electrode sheet 1 and the separator 5, by use of a syringe 11 or the like. On the other hand, the cathode electrode sheet 2 is supplied with oxygen by permeation through the cathode-side sealing sheet 7.

As a result, at the anode electrode sheet 1 in the biofuel cell 10 in this embodiment, the fuel is decomposed by the enzyme immobilized on the electrode surface, whereon electrons are taken out, and protons ($H^+$) are generated. On the other hand, at the cathode electrode sheet 2, water is produced from the proton transported from the anode electrode sheet 1 through the protonic conductor, the electron sent from the anode electrode sheet 1 through an external circuit, and oxygen which is present, for example, in the vicinity of the cathode electrode sheet 2.

Thereafter, when the output of the biofuel cell 10 is lowered with the lapse of time, it suffices to stir the solution inside the cell by, for example, a method in which the biofuel cell 10 is massaged or bent by hand. By such a method, the cell performance can be easily restored.

[Reference Electrode]

Incidentally, in the biofuel cell 10 according to this embodiment, if necessary, a reference electrode for checking of cell performance, particularly, fuel electrode performance may be provided between the anode electrode sheet 1 and the separator 5. This ensures that a lowering in cell performance can be monitored. Therefore, the user can be informed of good timing for restoration of cell performance. As the reference electrode, there can be used any electrode that does not lower the flexibility of the cell as a whole, for example, a Ag/AgCl electrode.

In the biofuel cell 10 according to the present embodiment, the cell section 9 and the sealing sheets 6 and 7 constituting the casing are formed from flexible materials. This configuration permits the cell to be easily deformed, as a whole or partly, by an external pressure. In addition, since the oxidoreductase used as a reaction catalyst in the biofuel cell 10 in this embodiment is high in substrate characteristic, there is no possibility of crossover of fuel. Consequently, the degree of freedom in structural design is enhanced. In addition, the solution (fuel solution, electrolyte solution, or the like) with which the cell is filled can be stirred by an easy method, such as bending of the cell.

As a result of the above, it is possible to supply the fuel when the fuel is exhausted and to cancel pH gradient and reaction inhibitor accumulation which are generated at the fuel electrode and/or the air electrode. Accordingly, the cell performance lowered with the lapse of time can be easily restored. In addition, while fuel cells according to the related art have been filled with a strong alkali solution or organic solvent, the biofuel cell according to this embodiment is based on the use of a comparatively safe solution such as an aqueous solution with a neutral pH; accordingly, even upon flowing of the solution out of the biofuel cell, safety is secured and there is no fear of inflammation or the like.

In the fuel cell 10 according to the present embodiment, it is possible, by selection of thin materials, to realize a cell with a thickness of not more than 1 mm and, further, to effect power generation in the condition where the cell is folded.

Incidentally, the configuration according to this embodiment is applicable not only to fuel cells of a "monocell" structure in which a single cell section 9 is provided in a cell body but also to fuel cells of a structure in which a plurality of cell sections are connected in series or in parallel.

<2. Second Embodiment>
[General Configuration of Cell]

Figure 2:
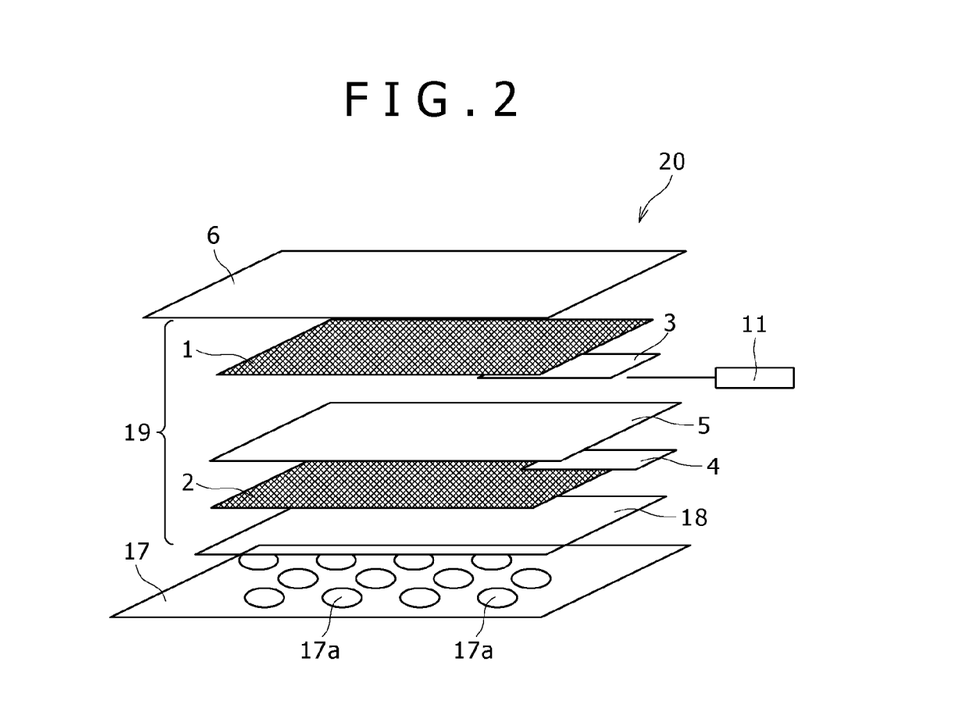
FIG. 2 is an exploded perspective view showing the configuration of a biofuel cell according to a second embodiment of the present technology.

Now, a biofuel cell according to a second embodiment of the present technology will be described below. FIG. 2 is an exploded perspective view showing the configuration of the biofuel cell in this embodiment. Incidentally, in FIG. 2, the same components of the fuel cell as those in the first embodiment shown in FIG. 1 above are denoted by the same reference symbols as used above, and detailed descriptions of the same components will be omitted. As shown in FIG. 2, in the biofuel cell 20 according to this embodiment, a gas-permeable membrane 18 is disposed between a cathode electrode sheet 2 and a cathode-side sealing sheet 17, and the cathode-side sealing sheet 17 is provided with a plurality of holes.

[Gas-Permeable Membrane 18]

The gas-permeable membrane 18 is a membrane which is impermeable to liquid and permeable only to gas. As the gas-permeable membrane 18, for example, a PTFE film or the like can be used. Besides, the thickness and physical properties of the gas-permeable membrane 18 are not specifically restricted, insofar as the gas-permeable membrane 18 has such flexibility and bendability as not to lower the flexibility of the cell as a whole and is not greatly changed in properties when bent.

[Sealing Sheet 17]

The sealing sheet 17 is provided with a plurality of holes 17a through which air is taken into the cell. The number and the size(s) of the holes 17a can be appropriately set, according to cell output, operating environments, or the like. In addition, the sealing sheet 17 may be any one that has such flexibility and bendability as not to lower the flexibility of the cell as a whole and that is not greatly changed in properties when bent.

In the biofuel cell according to this embodiment, the gas-permeable membrane 18 prevents the solution in the cell from flowing out. In addition, the holes 17a formed in the sealing sheet 17 contribute to an increase in the quantity of air (oxygen) flowing into the inside of the cell, whereby a larger quantity of oxygen can be supplied to the air electrode (anode electrode sheet 2).

Incidentally, the other configurations, operations and effects pertaining to the present embodiment than the above-mentioned are equivalent or similar to those pertaining to the first embodiment described above. Besides, the configuration according to this embodiment, also, is applicable not only to fuel cells of a "monocell" structure in which a single cell section 19 is provided in a cell body but also to fuel cells of a structure in which a plurality of cell sections are connected in series or in parallel.

<3. Third Embodiment>
[General Configuration of Cell]

Figure 3:
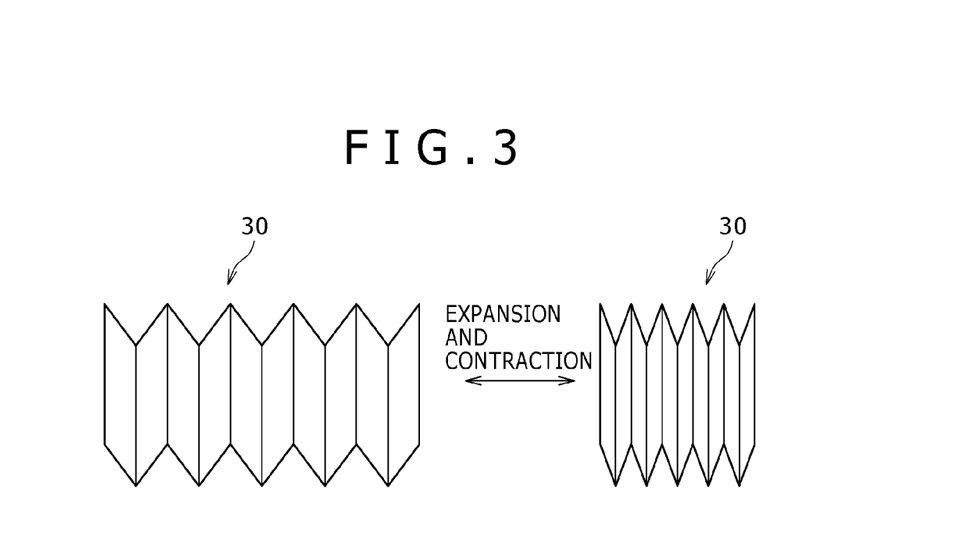
FIG. 3 is a schematic illustration of operation of a biofuel cell according to a third embodiment of the present technology.
Figure 4:
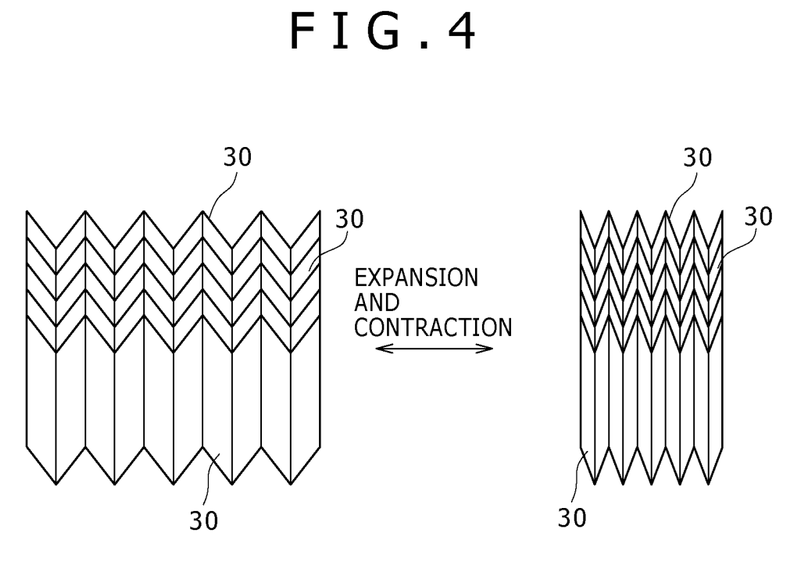
FIG. 4 is a schematic illustration of operation of a stack of the biofuel cells shown in FIG. 3.

Now, a biofuel cell according to a third embodiment of the present technology will be described below. FIG. 3 schematically illustrates operation of the biofuel cell in this embodiment, and FIG. 4 schematically illustrates operation of a stack of the biofuel cells shown in FIG. 3. As shown in FIG. 3, in the biofuel cell 30 according to this embodiment, the biofuel cell according to any of the first and second embodiments as above-described has a bellows structure in which a mountain fold and a valley fold are repeatedly formed.

The biofuel cell according to any of the first and second embodiment as above-described is fabricated by use of flexible materials, and is high in the degree of freedom in structural design; therefore, the biofuel cell can be provided with such a bellows structure as shown in FIG. 3. This permits a plurality of the cells to be stacked while maintaining regular intervals so as to ensure good flow of air near the air electrodes. Consequently, the surface area per unit volume can be increased and, particularly, the performance of the air electrode can be enhanced. Further, as shown in FIG. 3, in this biofuel cell 30, it is possible to stir the solution in the cell by expanding and contracting the cell as a whole and, therefore, it is possible to easily restore the cell performance.

Furthermore, the biofuel cell with the bellows structure as above-mentioned ensures that a plurality of the cells can be connected in series or in parallel, by stacking the cells, as shown in FIG. 4. In this case, the sealing sheets may be provided with connection terminals. As a result, a battery having a high output density can be obtained. Besides, even in the case where a plurality of the cells are thus stacked, the solution in each of the cells can be stirred by expanding and contracting the stacked cells as a whole, as shown in FIG. 4. Accordingly, cell performance can be restored easily and assuredly.

EXAMPLE

Figure 5A:
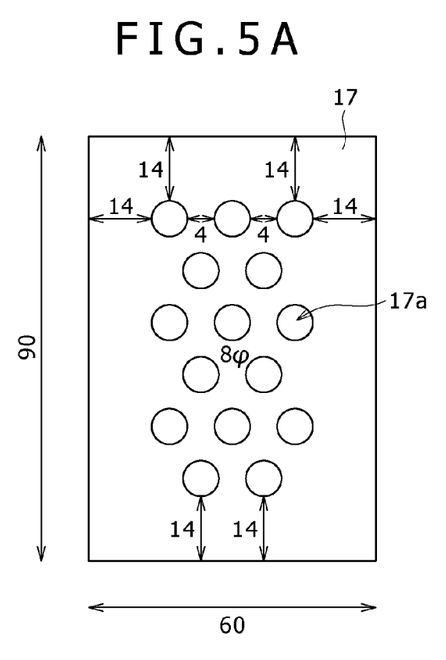
FIGS. 5A and 5B illustrate a layout of holes in a cathode-side sealing sheet used in a biofuel cell in a working example of the present technology.
Figure 5B:
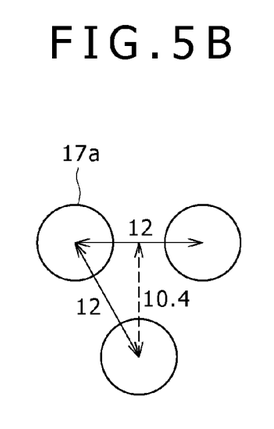

Now, effects of embodiments of the present technology will be specifically described below by showing a working example of the present technology. In this example, while using the biofuel cell 20 according to the second embodiment shown in FIG. 2 above, a behavior of current upon exertion of an external pressure on the cell was examined. FIGS. 5A and 5B illustrate the layout of holes 17a in the cathode-side sealing sheet 17 used in the biofuel cell in this example. In this case, a carbon fiber electrode (4 cm×7 cm) with an enzyme (GDH), a coenzyme (NADH) and a mediator e.g., ANQ) immobilized thereon was used as the anode electrode sheet 1. In addition, a carbon fiber electrode (4 cm×7 cm) with an enzyme (BOD) and a mediator [Fe(CN)6]4—immobilized thereon was used as the cathode electrode sheet 2.

Besides, titanium meshes measuring 4 cm×2 cm were used as the current collectors 3 and 4, and were electrically conductively connected respectively to the electrode sheets 1 and 2 with a conductive adhesive (a material containing natural graphite and a binder dispersed in an organic solvent). Further, a piece of non-woven fabric of PTFE cut to 7.5 cm×4.5 cm was used as the separator 5. Furthermore, a piece of adhesive tape having a 50 μm-thick polyester film as a base material and cut to 9 cm×6 cm was used as the anode-side sealing sheet 6. On the other hand, a piece of 50 μm-thick PTFE film cut to 9 cm×6 cm was used as the cathode-side sealing sheet 17, which was provided with a plurality of holes 17a having a diameter of 8 mm, as shown in FIGS. 5A and 5B. Further, a solution (pH 7) containing 0.4 M of glucose (grape sugar) and 2 M of imidazole was used as the fuel solution.

Figure 6:
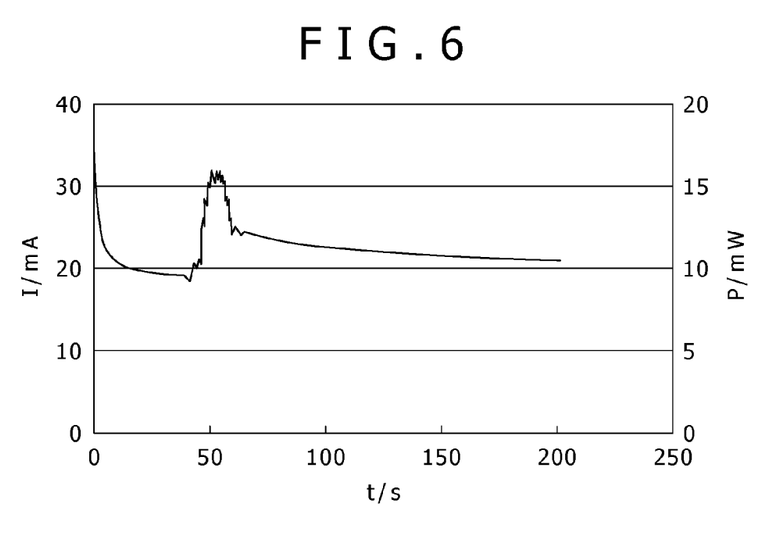
FIG. 6 is a graph showing a behavior of current observed when an external pressure is exerted on the biofuel cell according to the working example of the present technology, with time taken on the axis of abscissas and with current taken on the axis of ordinates.

The flexible biofuel cell configured as above was operated at an operating voltage of 0.5 V. FIG. 6 is a graph showing a behavior of current when an external pressure is exerted on the biofuel cell according to this example, with time taken on the axis of abscissas and with current on the axis of ordinates. As shown in FIG. 6, it was confirmed that, when the biofuel cell 20 in this example configured as above was bent by hand during power generation, the cell performance was restored. This is considered to be attributable to assured supply of the fuel (grape sugar) to the fuel electrode owing to deformation of the cell.

The present disclosure contains subject matter related to that disclosed in Japanese Priority Patent Application JP 2010-114139 filed in the Japan Patent Office on May 18, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A fuel cell comprising:
   one or more cell sections;
   one or more sealing sheets covering the one or more cell sections,
   wherein each of the one or more cell sections comprises a pair of electrode sheets forming an anode and a cathode, and wherein one of the anode and the cathode has an oxidoreductase present at a surface thereof;
   a separator disposed between the pair of electrode sheets and comprising a proton-permeable membrane;
   a pair of current collectors electrically conductively connected respectively to the pair of electrode sheets with a conductive adhesive; and
   a fuel reservoir section disposed such that the fuel reservoir section makes contact with at least the anode, and wherein the fuel reservoir section contains a fuel solution containing a fuel component,
   wherein the fuel cell has a bellows structure comprising a mountain fold and a valley fold that are repeatedly formed.

2. The fuel cell according to claim 1, wherein the pair of electrode sheets is formed from carbon fibers.

3. The fuel cell according to claim 1, wherein one of the one or more sealing sheets covering the cathode comprises:
   a plurality of holes; and
   a gas-permeable membrane impermeable to liquid and permeable only to gas, the gas-permeable membrane disposed between one of the one or more sealing sheets and the electrode sheet constituting the cathode.

4. The fuel cell according to claim 1, further comprising, in the one or more cell sections, a reference electrode for checking cell performance.

5. The fuel cell according to claim 1, wherein the one or more sealing sheets are provided with connection terminals, and a plurality of fuel cells are connected in series or in parallel with each other through stacking using the connection terminals.

6. A fuel cell comprising:
   one or more cell sections;
   a sealing sheet covering the one or more cell sections,
   wherein each of the one or more cell section comprises a pair of electrode sheets forming an anode and a cathode, and wherein one of the anode and the cathode has an oxidoreductase present at a surface thereof;
   a separator disposed between the pair of electrode sheets and comprising a proton-permeable membrane;
   a pair of current collectors electrically conductively connected respectively to the pair of electrode sheets with a conductive adhesive; and
   a fuel reservoir section disposed such that the fuel reservoir section makes contact with at least the anode, and wherein the fuel reservoir section contains a fuel solution containing a fuel component,
   wherein the fuel cell has a bellows structure comprising a mountain fold and a valley fold that are repeatedly formed,
   wherein the sealing sheet is provided with terminals, and the plurality of fuel cells are connected in series or in parallel with each other through stacking.

* * * * *